No. 785,788. PATENTED MAR. 28, 1905.
R. ZENTNER.
DENTAL TOOL.
APPLICATION FILED OCT. 26, 1903.
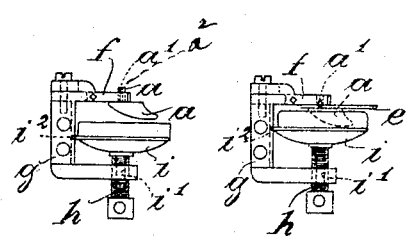
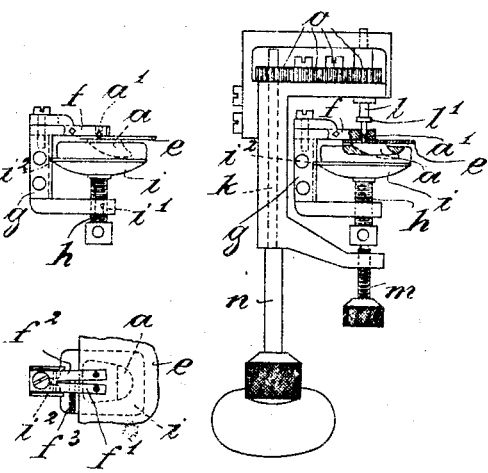
Witnesses:
Paul Wollenberg.
Emil Kayser.
Inventor:
Raimund Zentner.
by Rumedeister
Attorney No. 785,788. Patented March 28, 1905.

UNITED STATES PATENT OFFICE.

RAIMUND ZENTNER, OF WIESBADEN, GERMANY.

DENTAL TOOL.

SPECIFICATION forming part of Letters Patent No. 785,788, dated March 28, 1905.

Application filed October 26, 1903. Serial No. 178,555.

*To all whom it may concern:*

Be it known that I, RAIMUND ZENTNER, a subject of the Grand Duke of Hesse-Nassau, and a resident of 21 Friedrichstrasse, Wiesbaden, in the Province of Hesse-Nassau, German Empire, have invented certain new and useful Improvements in Dental Tools, of which the following is an exact specification.

My invention relates to improvements in dental tools, and more especially to a device for riveting porcelain teeth to metal bridges.

The purpose of the invention is to provide a device by means of which the teeth can be fixed to bridges which are cemented in the mouth, so that the same cannot be taken out. I attain this purpose by the construction illustrated in the accompanying drawings, in which—

Figure 1 is a side view of a screw-clamp for holding the teeth in the position in which the teeth are to be fixed. Fig. 2 is a side view of the same in the position in which the teeth are fixed in the clamp and brought to the riveting device proper. Fig. 3 is a plan of the tool in the position shown in Fig. 2. Fig. 4 shows the riveting device with the screw-clamp fixed in the same.

In the drawings, $g$ is the U-shaped frame, one shank $f$ of which consists of two parts $f'$ and $f^2$, Fig. 3, situated one at the side of the other.

$f^3$ is a set-screw for adjusting the distance between the parts $f'$ and $f^2$ of the shank $f$. The free ends of the parts $f'$ and $f^2$ are each provided with a hole for taking up the pins fixed to the tooth $a$ to be riveted to the bridge.

$i$ is a cup filled with a resin-like material for taking up the tooth $a$.

$h$ is a screw-spindle provided with a bore in which a pin $i'$, fixed to the cup $i$, is situated. Advantageously the cup $i$ is provided with a nose $i^2$, which is guided in a groove of the frame $g$, so that this cup $i$ cannot be turned by turning the screw $h$, but can only be moved upward and downward.

In Figs. 2 and 3, $e$ is a plate or bridge to which the tooth $a$ is to be fixed.

The teeth are fixed in this clamp in the following manner: The tooth $a$ is provided with two rearwardly-extending metal pins $a'$, which are usually placed at either side of the longitudinal central axis of the tooth and by means of which the tooth is to be riveted to the plate or bridge $e$. Over these pins $a'$ small tubes $a^2$ are shifted. The tooth is then brought into the clamp $g$ and is fixed in the same by shifting the pins $a'$, with the tubes $a^2$ around them, into the holes of the parts $f'$ and $f^2$, for which purpose the distance between the parts $f'$ and $f^2$ must be previously adjusted so that the distance between the holes corresponds exactly to the distance between the pins $a'$. The cup $i$ is then filled with a hot resin-like material and by turning the screw-spindle $h$ pressed against the tooth $a$. After the material in the cup $i$ is congealed the tooth is fixed in the cup $i$. The cup $i$ is then lowered and the tubes $a^2$ are taken off the pins $a'$. The tooth is then clamped to the bridge $e$, in which holes must be provided for taking up the pins $a'$. After the tooth is thus fixed to the bridge the riveting proper takes place. The riveting device consists of a U-shaped frame $k$ in one shank of which a rotatable riveting-stud $l$ is journaled. This stud is rotated by gearings $o$ from a shaft $n$, provided with a handle $n'$. $m$ is a set-screw provided with a point which fits into small holes in the head of the screw $h$ of the screw-clamp. After the tooth has been fixed, by means of the screw-clamp, to the bridge the riveting device is brought around the screw-clamp in the manner shown in Fig. 4 of the drawings. By gradually tightening the set-screw $m$ and by turning the riveting-stud $l$ by means of the handle $n'$ and the shaft $n$ and the gearings $o$ the pins $a'$ are riveted to the plate or bridge $e$. As the holes in the shanks $f$ are larger than the pins $a'$, around which pins annular spaces are situated, (in which spaces the tubes $a^2$ were situated before,) an equal riveting can take place and a riveting-head can be formed. Advantageously the stud $l$ is provided with a stop $l'$, which is situated so that in case the stop touches the shank $f$ of the screw-clamp frame $g$ the riveting of the respective pin $a'$ is completed.

It will be understood that by means of this device teeth can be attached to bridges which are cemented in the mouth so that the same cannot be taken out and that the device can also be used for riveting teeth for all kinds of bridgework or platework.

Having thus fully described the nature of my invention, what I desire to secure by Letters Patent of the United States, is—

1. In a dental tool for attaching teeth to a backing, the combination of a screw-clamp for pressing the tooth against the backing, one shank of said clamp being provided with holes for taking up the pins fixed to the teeth, a U-shaped frame, a riveting-stud journaled in one shank of said frame, means for rotating said riveting-stud and a screw situated in the other shank of the frame opposite to the riveting-stud, substantially as described and for the purpose set forth.

2. In a dental tool for attaching teeth to a backing, the combination of a U-shaped frame, one shank of said frame consisting of two parts, each of which is provided with a hole for taking up the pins of the teeth, means for adjusting the distance between these two parts a set-screw situated in the other shank of said frame, a second U-shaped frame adapted to be placed around the first frame, a riveting-stud journaled in one shank of said second frame, means for rotating said riveting-stud, and a set-screw situated in the other shank of the second frame opposite to the riveting-stud, substantially as described and for the purpose set forth.

3. In a dental tool for attaching teeth to a backing, the combination of a U-shaped frame, one shank of said frame consisting of two parts, each of which is provided with a hole, for taking up the pins of the teeth, means for adjusting the distance between these two parts, a hollow set-screw situated in the other shank of said frame, a cup provided with a pin fitting into the bore of said set-screw, a second U-shaped frame adapted to be placed around the first frame, a riveting-stud journaled in one shank of said second frame, means for rotating said riveting-stud and a set-screw situated in the other shank of the second frame opposite to the riveting-stud, substantially as described and for the purpose set forth.

4. In a dental tool for attaching teeth to a backing, the combination of a U-shaped frame, one shank of said frame consisting of two parts, each of which is provided with a hole, for taking up the pins of the teeth, a hollow set-screw situated in the other shank of said frame, a cup provided with a pin fitting into the bore of said screw, a second U-shaped frame adapted to be placed around the first frame, a riveting-stud journaled in one shank of said second frame, a shaft provided with a handle journaled in the bottom of this second frame, gearings transferring the rotations of said shaft to the riveting-stud, and a set-screw situated in the other shank of the second frame opposite to the riveting-stud, substantially as described and for the purpose set forth.

In testimony whereof I have signed my name to this specification in the presence of two subscribing witnesses.

RAIMUND ZENTNER.

Witnesses:
JEAN GRUND,
CARL GRUND.